(12) United States Patent
Faerber et al.

(10) Patent No.: US 7,546,306 B2
(45) Date of Patent: Jun. 9, 2009

(54) OBJECT METAMODEL COMPRISING VIEWS ON A JOIN GRAPH

(75) Inventors: Franz-X. Faerber, Walldorf (DE); Wolfgang Stephan, Heidelberg (DE); Christian M. Bartholomae, Oftersheim (DE); Guenter Radestock, Karlsruhe (DE)

(73) Assignee: SAP AG, Walldorf (DE)

( * ) Notice: Subject to any disclaimer, the term of this patent is extended or adjusted under 35 U.S.C. 154(b) by 454 days.

(21) Appl. No.: 11/357,402

(22) Filed: Feb. 16, 2006

(65) Prior Publication Data

US 2007/0192343 A1    Aug. 16, 2007

(51) Int. Cl.
*G06F 17/00* (2006.01)

(52) U.S. Cl. ............... 707/101; 707/103 R; 707/3; 707/4

(58) Field of Classification Search ............... None
See application file for complete search history.

(56) References Cited

U.S. PATENT DOCUMENTS

| | | | | |
|---|---|---|---|---|
| 5,345,585 A | * | 9/1994 | Iyer et al. | 707/2 |
| 6,449,606 B1 | * | 9/2002 | Witkowski | 707/3 |
| 6,947,927 B2 | * | 9/2005 | Chaudhuri et al. | 707/3 |
| 6,996,567 B2 | * | 2/2006 | Ghukasyan | 707/100 |
| 6,999,967 B1 | * | 2/2006 | Ghazal et al. | 707/101 |

* cited by examiner

*Primary Examiner*—Pierre M Vital
*Assistant Examiner*—Loan T Nguyen
(74) *Attorney, Agent, or Firm*—Mintz, Levin, Cohn, Ferris, Glovsky and Popeo, P.C.

(57) ABSTRACT

A method is disclosed for modeling application-level objects in terms of join graphs defined over tables containing structured data residing in a relational database. In accordance with the disclosed metamodel, each object is modeled logically as a join graph. A query received from an application that requests the return of objects meeting certain conditions is reformulated to refer to the metamodel. The metamodel includes an index structure having a plurality of indexes and a set of join conditions that specify relationships between the indexes. Some series of join conditions form join paths, such that each join path originates on an anchor table and ends on a table corresponding to one of the plurality of indexes. The metamodel further includes at least one view representing a subgraph of the join graph having at least one anchor table as a key.

20 Claims, 4 Drawing Sheets

OBJECT METAMODEL COMPRISING VIEWS ON A JOIN GRAPH

BACKGROUND

Modern search engines have revolutionized retrieval of unstructured (i.e. textual) information from large data repositories. However, the retrieval of structured information from databases is often limited by traditional approaches that are tightly integrated with a particular relational database design.

Searches on structured data are usually performed on databases. Specialized retrieval software comes into play when answering a query involves searches on both texts and structured data or when queries need to be answered against structured data from specific application domains. Specialized retrieval software is also suitable for answering queries about structured data in cases where there are specific performance requirements or where the operations are performed in novel or unusual landscape configurations.

Structured data stored in relational database tables can be used to model highly constrained objects in specialized application domains in such a way that sophisticated processing is required to extract that data and make it available for business use. A retrieval engine that is optimized to work with such specialized data models can offer levels of performance and flexibility that greatly exceed those achieved with existing general-purpose databases.

To facilitate the development of fast and flexible retrieval services for structured data in the context of modern business applications, what is needed is a logically powerful metamodel that not only supports the modeling of objects that are important in those business applications but also allows the development of efficient implementations of those retrieval services.

SUMMARY

This document discloses a set of methods for use when implementing an information retrieval service that facilitates the retrieval of structured information. According to one aspect, an information retrieval service makes use of a metamodel that describes a domain of structured objects and the relations between them. These structured objects are built up from data held in a standard relational database.

A system and method for efficiently executing a search for structured objects is suitably hosted in an information retrieval service having an index server. Each object can be represented for the purposes of the index server as a join graph. A query received by the index server is redefined according to a metamodel that may be understood as having been provided by a meta engine. The metamodel includes an index structure having a plurality of indexes, each index representing one or more tables, and a set of join conditions that specify relationships between the indexes. Each join condition specifies how the respective rows of two tables are to be joined with each other to form a set of extended rows. Sequences of one or more join conditions define join paths. Each join path originates on an anchor table and ends on a table represented by one of the plurality of indexes. The metamodel further includes at least one view representing a subgraph of the join graph having at least one anchor table as a key.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
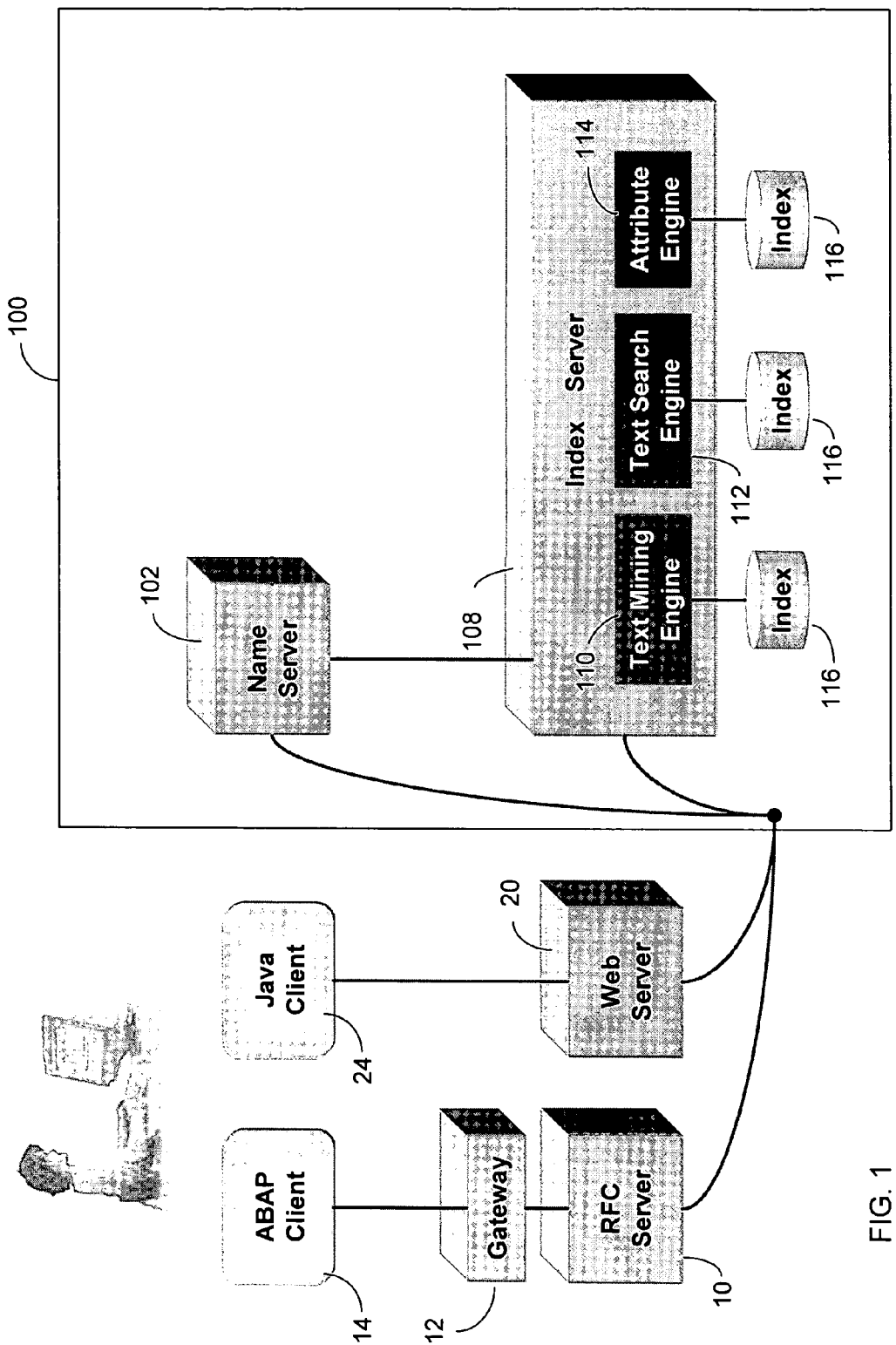
FIG. 1 shows a retrieval service system upon which embodiments of a metamodel can be suitably executed.

This document describes a metamodel for representing objects by means of a join graph which is designed to facilitate the operations of an engine capable of retrieving the data for those objects from a relational database. FIG. 1 shows a retrieval service system 100 upon which embodiments of the metamodel can be suitably executed for searching structured information. In some embodiments, the retrieval service system 100 is similar to the SAP NetWeaver TREX (Text Retrieval and Extraction) search and classification engine, developed by SAP AG of Walldorf, Germany.

The retrieval service system 100 receives queries from an application system. The application system may in turn receive queries from a front-end user interface. The application system may communicate with the retrieval service system 100 via a web server 20, which in turn receives hypertext transport protocol (HTTP) requests from a client 24, such as a JAVA client program. Alternatively, in the case of the TREX implementation, queries can also be received from a Remote Function Call (RFC) server 10 via an SAP gateway 12 from a business application client 14, which may be programmed in the SAP Advanced Business Application Programming (ABAP) language.

A name server 102 receives information about incoming requests and, in the case of a distributed landscape where several index servers are available to share the load, for example by respectively holding different indexes in their memory spaces, directs requests to the appropriate index server 108. The index server 108 includes several engines configured for particular types of searches, which return a number of results to the index server 108 for return to the application that sent the request. Requests for structured data are sent to an attribute engine 114.

Figure 2:
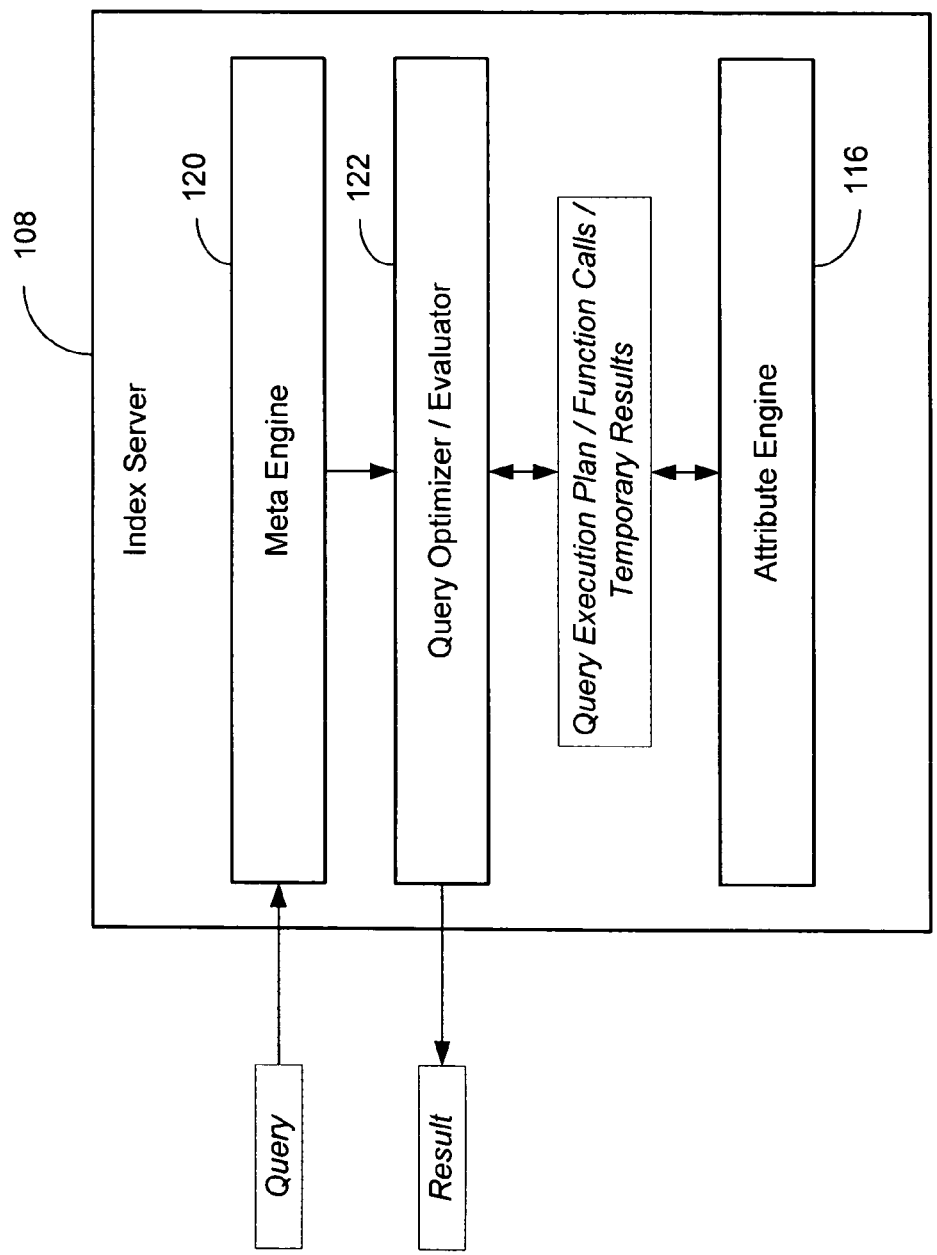
FIG. 2 illustrates an index server of a retrieval service for structured information.

FIG. 2 illustrates the index server 108 of some embodiments of a retrieval service for structured information. The index server 108 includes the attribute engine 116 for performing query plan operations on structured data, via function calls to the attribute engine and according to a query execution plan. The index server 108 includes functionality that is represented as meta engine 120 configured to receive the query and process the query according to a metamodel. The index server 108 may include a query optimizer/evaluator 122 that optimizes the query if necessary.

The metamodel describes a domain of structured objects and the relations between them. These structured objects are built up from data held in a standard relational database. This metamodel is built completely on top of the relations of the database model and uses as its data source the tables (from which the retrieval service system 100, in preparation for request processing, creates corresponding indexes) from the database, upon which it defines a set of joins between those tables.

A benefit of the disclosed metamodel is that any structured object with the appropriate logical similarities to an SAP Business Object can be represented by a join graph, one or more views on the join graph, and semantic relations between the object and other objects. Thus, the metamodel has general applicability for modeling structured data from a relational database as structured objects of the sort that may be relevant in software used in such fields as business applications. The information retrieval service retrieves data in response to requests formulated in terms of the metamodel elements described below, which offers speed benefits compared with a typical database solution. Even some semantic relations between the objects can be represented in terms of elementary engine functions, such as relations that may be used for sorting or ranking results.

Figure 3:
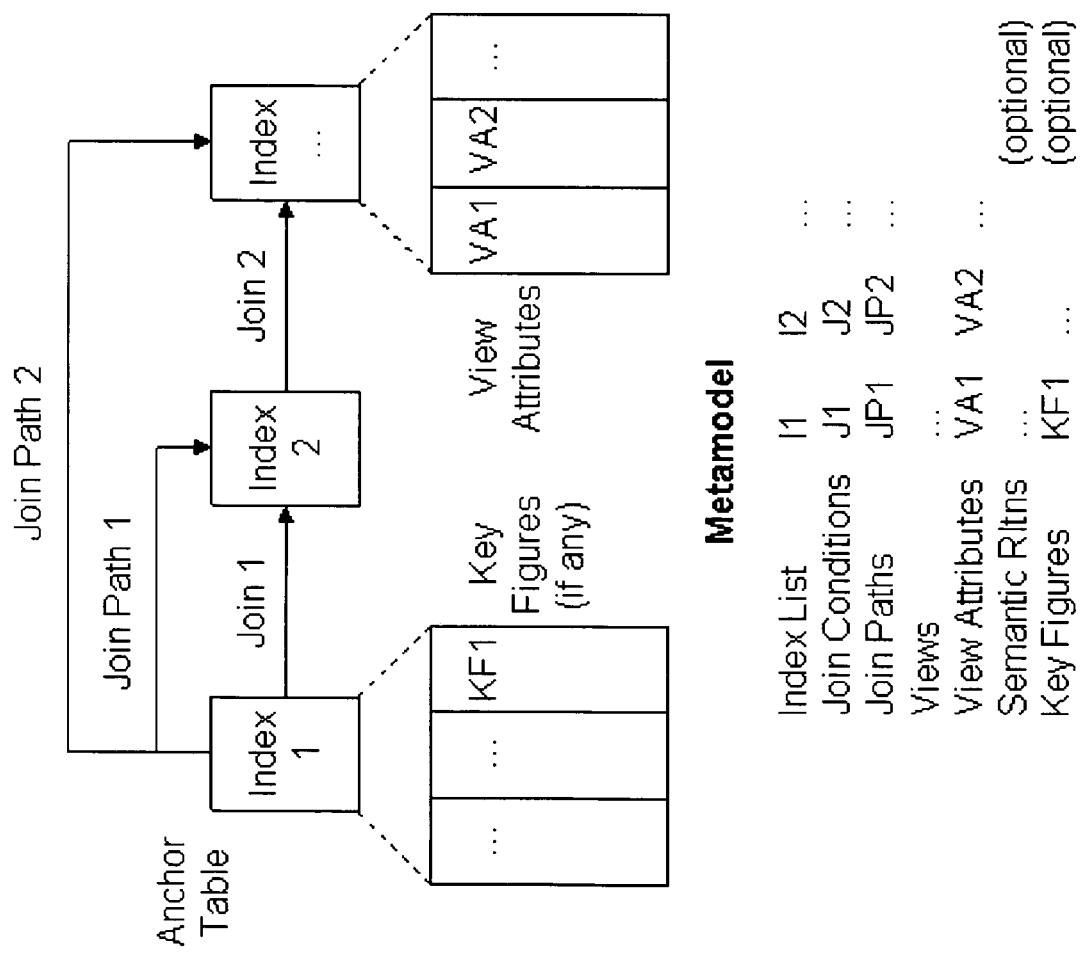
FIG. 3 depicts a structure of a metamodel.

In accordance with exemplary embodiments, and as graphically depicted in FIG. 3, the metamodel elements that define a model are as follows.

Index List: List of (Index Name, Index Type)

The metamodel may combine several indexes in a single structure, and need not necessarily be organized as a tree. Each index corresponds directly to a table. In some applications, the tables are organized in a star schema. The logical relationships in the star schema are represented in the model as join conditions and join paths.

Join Conditions: List of (Join Name, Index1.Field1→Index2.Field2, Any Constraints)

Join conditions specify the relationships between the indexes. Joins may be inner, left outer or right outer joins. Each join condition maps a field in a first index to a field in a second index. The ordering of fields as first and second is important for left and right outer joins, because the order influences the results selected. The constraints limit the scope of the joins and can be in either the first or the second index. They always take the form "index.field=constant." Constraints are needed only in some models.

Join Paths: List of (Join Path Name, Join Names, Constraint)

A join path consists of a series of join conditions that starts at an anchor table and ends on an index. An anchor table defines the keys of the objects and contains the target information that a user can access by means of a view.

Views: List of (View Name, Anchor Table, List of View Attributes)

Each view presents a subgraph of the join graph with the anchor table as key. There is always at least one view, the default view, of the full join graph.

View attributes: List of (Name, Index, Field, Join Path, View Name)

View attributes are the attributes that appear in views. If no view name is specified, the view attributes appear in the default view. Each view attribute is linked to the anchor table via a specified join path.

Semantic Relations: List of (Relation Name, Semantic Type, Join Path, View Name)

Semantic relations associate specific meanings with join paths in views. A view can contain multiple semantic relations. An example of a semantic type is a ranking in which result sets are ordered by number of joined items pointing to each item in the result set. Semantic relations are an optional part of the metamodel.

Key Figures: List of (Key Figure Name, Default Aggregation, Return Type)

Key figures are numerical quantities such as sales totals that may be of interest. These may be aggregated with functions such as sum or average. Return types are data types such as integer. Key figures are an optional part of the metamodel.

Figure 4:
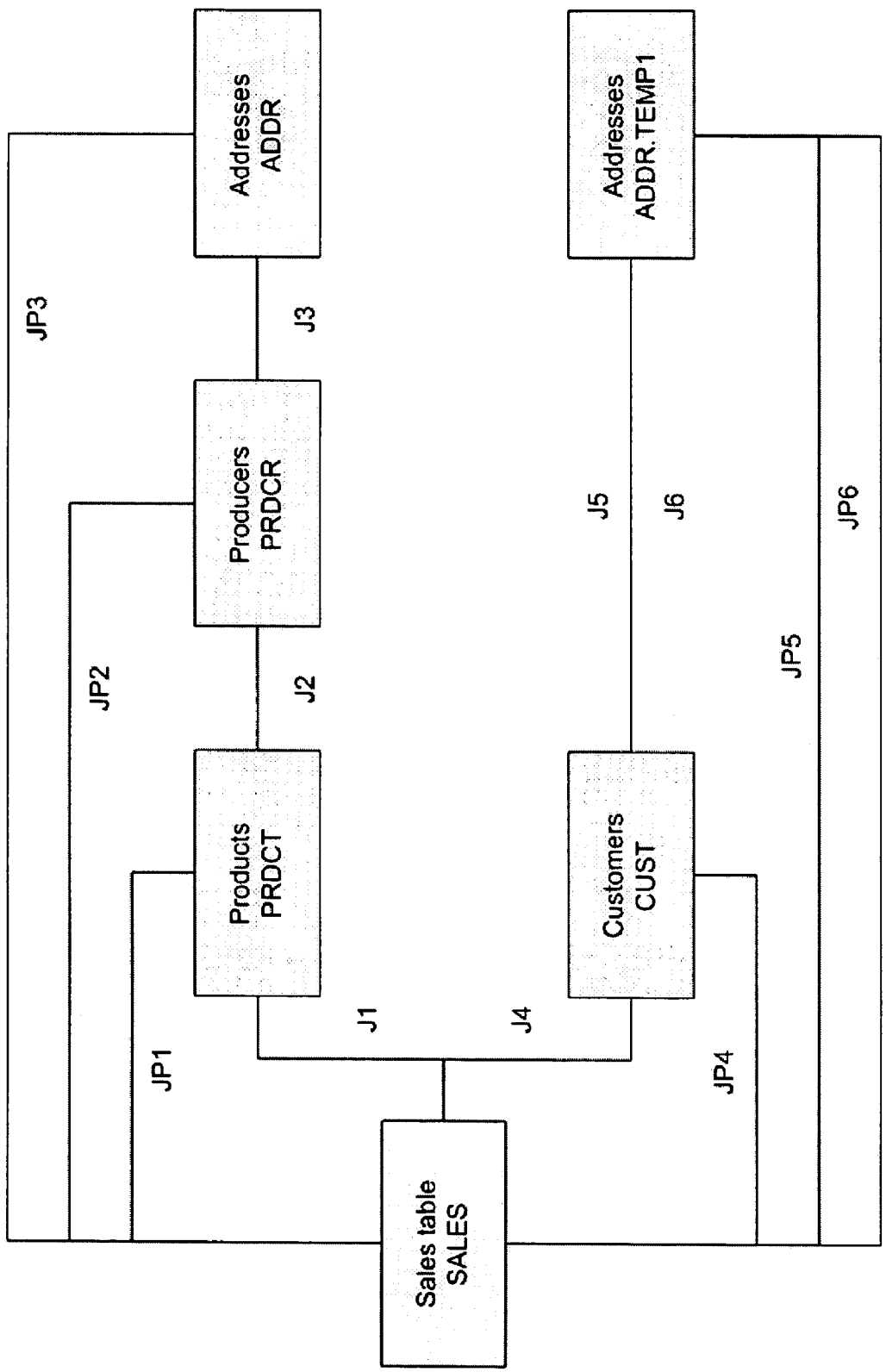
FIG. 4 is an illustrative example of a metamodel and its components.

In an example scenario, a view of sales information may present a table with columns showing sales details and product details. FIG. 4 graphically illustrates some of the metamodel elements for this example. An information retrieval service as described above, such as the TREX information retrieval service, uses the model to answer a query such as: Return a list of all sales over $1000 to German customers.

In the syntax presented below and shown in FIG. 4, the query becomes:

VA2=Germany AND VA5>$1000

To answer the query, the information retrieval service retrieves data from field ADDR.TEMP1.NAT in table ADDR.TEMP1 via join path JP5 and field PRDCT.PRI in table PRDCT via join path JP1.

TEMP indexes are introduced to handle queries with forms such as:

VA1=Germany and VA2=Germany

In this case, the address table needs to be accessed twice. To prevent a situation in which the result set contains only results where customer address=producer address, the second access to the address table occurs via an alias, which is a logical copy of the address table. Such logical copies have names ADD.TEMP1.n. The exemplary metamodel is logically specified as follows:

Index List (these indexes correspond to tables on the database)
  SALES Sales—default view
  PRDCR Producers
  PRDCT Products
  CUST Customers
  ADDR Addresses of producers and customers
  ADDR.TEMP1 Alias for address table Join Conditions (these joins define mappings between the named table cells)

| J1 | PRDCT.ID | → | SALES.PT_ID | From products to sales |
| J2 | PRDCR.ID | → | PRDCT.PR_ID | From producers to products |
| J3 | ADDR.ID | → | PRDCR.AD_ID | From addresses to producers |
| J4 | CUST.ID | → | SALES.CU_ID | From customers to sales |
| J5 | ADDR.TEMP1.ID | → | CUST.AD_ID | From addresses to customers Inner join: both fields mandatory |
| J6 | ADDR.TEMP1.ID | → | CUST.AD_ID | From addresses to customers Right outer join: address optional |

Join Paths (these are concatenations of join conditions)

| JP1 | J1 | | |
| JP2 | J2 | J1 | |
| JP3 | J3 | J2 | J1 |
| JP4 | J4 | | |
| JP5 | J5 | J4 | |
| JP6 | J6 | J4 | |

View Attributes (the values of these attributes are viewed at the user interface)

| | | | | |
|---|---|---|---|---|
| VA1 | ADDR | ADDR.NAT | JP3 | Producer nationality |
| VA2 | ADDR.TEMP1 | ADDR.TEMP1.NAT | JP5 | Customer nationality |
| VA3 | ADDR | ADDR.CIT | JP3 | Producer city |
| VA4 | ADDR.TEMP1 | ADDR.TEMP1.CIT | JP5 | Customer city |
| VA5 | PRDCT | PRDCT.PRI | JP1 | Product price |
| VA6 | CUST | CUST.NAM | JP4 | Customer name |
| VA7 | PRDCR | PRDCR.NAM | JP2 | Producer name |
| VA8 | ADDR.TEMP1 | ADDR.TEMP1.ADD | JP5 | Customer address (mandatory case)* |
| VA9 | ADDR.TEMP1 | ADDR.TEMP1.ADD | JP6 | Customer address (optional case)** |
| ... | ... | ... | | |

*A result row for a customer appears only when an address is maintained.
**Optionally, a row for a customer name can also appear when no address is maintained.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A system comprising a computer readable medium that stores computer program instructions and a processor that executes the computer program instructions to create a searchable metamodel describing structured data objects that are built from structured data held in a plurality of tables of one or more relational databases having two or more different specific application domains, the searchable metamodel comprising:
   an index structure comprising a plurality of indexes, each index corresponding directly to one of the plurality of tables;
   at least one series of join conditions forming one of a plurality of join paths,each join condition in the series of join conditions specifying a logical relationship between two indexes of the plurality of indexes, the logical relationship comprising mapping a first field in one of the two indexes to a second field in the other of the two indexes, each join path originating on an anchor table and ending on one of the plurality of indexes, the anchor table containing keys that contain target information for the structured data objects in the relational database table corresponding to the one of the plurality of indexes;
   at least one view representing a subgraph of a join graph, the at least one view presenting the anchor table to provide the keys for accessing the structured data objects ;and
   wherein the metamodel processes a query of the structured data entered via the view, the query searching the one or more relational databases without requiring integration with the two or more different specific application domains.

2. A system in accordance with claim 1, wherein each of the views includes one or more view attributes.

3. A system in accordance with claim 1, wherein each view attribute is linked to at least one anchor table via a specified join path of the plurality of join paths.

4. A system in accordance with claim 1, wherein each of the views includes one or more semantic relations.

5. A system in accordance with claim 4, wherein each semantic relation associates specific meanings with each join path in the view.

6. A system in accordance with claim 4, wherein each semantic relation includes at least one semantic type.

7. A system in accordance with claim 6, wherein the at least one semantic type is a ranking in which result sets are ordered according to number of joined items pointing to each item in each result set.

8. A system in accordance with claim 1, wherein each join path of the plurality of join paths defines a join operation for the structured data object, the join operation being selected from a group of join operations that consist of: an inner join, a left outer join, and a right outer join.

9. An information retrieval service system for executing a database search of structured data objects that are built from structured data held in a plurality of tables of one or more relational databases having two or more different specific application domains, where each object can be represented as a join graph, the information retrieval service system comprising:
   an index server executed on a processor and having an attribute engine configured to execute the database search, and a meta engine configured to process a query related to the database search, the meta engine configuring the query according to a metamodel, the metamodel comprising:
      an index structure comprising a plurality of indexes, each index corresponding directly to one of the plurality of tables;
      at least one series of join conditions forming a join path, each join condition in the series of join conditions specifying a logical relationship between two indexes of the plurality of indexes, the logical relationship comprising mapping a first field in one of the two indexes to a second field in the other of the two indexes, the join path originating on an anchor table and ending on one of the plurality of indexes, the anchor table containing keys that contain target information for the structured data objects in the relational database table corresponding to the one of the plurality of indexes;
      at least one view representing a subgraph of a join graph, the at least one view presenting the anchor table to provide the keys for accessing the structured data objects;and
   wherein the metamodel processes a query of the structured data entered via the view, the query searching the one or more relational databases without requiring integration with the one or more specific application domains.

10. An information retrieval service system in accordance with claim 9, wherein each of the views includes one or more view attributes.

11. An information retrieval service system in accordance with claim 10, wherein each view attribute is linked to at least one anchor table via a specified join path of the plurality of join paths.

12. An information retrieval service system in accordance with claim 9, wherein each of the views includes one or more semantic relations, and wherein each semantic relation associates specific meanings with each join path in the view.

13. An information retrieval service system in accordance with claim 9, further comprising a query optimizer configured to optimize the query and to evaluate initial results of the database search of structured data objects.

14. An information retrieval service system in accordance with claim 12, wherein each semantic relation includes at least one semantic type, and wherein the at least one semantic type is a ranking in which result sets are ordered according to number of joined items pointing to each item in each result set.

15. An information retrieval service system in accordance with claim 9, wherein each join path of the plurality of join paths defines a join operation for the structured data object, the join operation being selected from a group of join operations that consist of: an inner join, a left outer join, and a right outer join.

16. A computer-implemented method of executing a database search of structured data objects that are built from structured data held in a plurality of tables of one or more relational databases having two or more different specific application domains, where each object can be represented as a join graph, the method comprising:

receiving a query requesting the database search of structured data objects; and redefining the query according to a metamodel, the metamodel including:

an index structure comprising a plurality of indexes, each index corresponding directly to one of the plurality of tables;

at least one series of join conditions forming a join path, each join condition in the series of join conditions specifying a logical relationship between two indexes of the plurality of indexes, the logical relationship comprising mapping a first field in one of the two indexes to a second field in the other of the two indexes, the join path originating on an anchor table and ending on one of the plurality of indexes, the anchor table containing keys that contain target information for the structured data objects in the relational database table corresponding to the one of the plurality of indexes;

at least one view representing a subgraph of a join graph, the at least one view presenting the anchor table to provide the keys for accessing the structured data objects;and wherein the metamodel processes a query of the structured data entered via the view, the query searching the one or more relational databases without requiring integration with the one or more specific application domains.

17. A method in accordance with claim 16, wherein each of the views includes one or more view attributes, and wherein each view attribute is linked to at least one anchor table via a specified join path, and wherein each anchor table defines keys of the structured data objects.

18. A method in accordance with claim 16, wherein each anchor table includes target information to provide access to a view for a user, and wherein each of the views includes one or more semantic relations, and wherein each semantic relation associates specific meanings with each join path in the view.

19. A method in accordance with claim 18, wherein each semantic relation includes at least one semantic type, and wherein the at least one semantic type is a ranking in which result sets are ordered according to number of joined items pointing to each item in each result set.

20. A method in accordance with claim 16, wherein each join path of the plurality of join paths defines a join operation for the structured data object, the join operation being selected from a group of join operations that consist of: an inner join, a left outer join, and a right outer join.

* * * * *